United States Patent Office 3,485,646
Patented Dec. 23, 1969

3,485,646
GLASS COMPOSITIONS
Albert E. Junge, New Kensington, Pa., assignor to PPG Industries, Inc., Pittsburgh, Pa., a corporation of Pennsylvania
No Drawing. Filed Oct. 21, 1965, Ser. No. 500,229
Int. Cl. C03c 3/16, 3/30
U.S. Cl. 106—47          6 Claims

ABSTRACT OF THE DISCLOSURE

The present invention relations to ultraphosphate glass compositions of high durability and low temperature melting characteristics. The invention particularly relates to phosphate glasses of the following composition:

| Component: | Percent |
|---|---|
| $P_2O_5$ | 55–80 |
| BaO | 15–30 |
| CaO | 2–6 |
| PbO | 3–7 |
| $Li_2O$ | 0.5–2.0 |
| $Al_3O_2$ | 0–1.0 |

Various phosphate glass compositions have been developed which exhibit relatively good chemical durability. One such family of phosphate glasses is disclosed in U.S. Patent 2,577,627 issued to Alexis Pincus, Dec. 4, 1951. The glasses disclosed consist essentially of the low atomic weight metal metaphosphates. The glasses are said to be very resistant to attack by fluoride vapors and hydrofluoric acid.

U.S. Patent 2,077,481 issued to Paul Huppert and Hans Wolff, Ludwigshafen-on-the-Rhine, Apr. 20, 1937, discloses a family of phosphate glass compositions having high ultraviolet light transmission characteristics and good resistance to solarization effects. The increased resistance to solarization is attributed to the use of ammonium phosphate as a batch ingredient. A typical glass is produced by fusing 5.4 parts aluminum oxide, 4.3 parts magnesium oxide, 13.5 parts barium carbonate, 148.4 parts secondary ammonium phosphate and 30.6 parts nitric acid at a temperature of about 1200° C. (2192° F.). All parts are parts by weight. The calculated chemical composition is 5.4 percent $Al_2O_3$, 4.3 percent MgO, 10.5 percent BaO, and 79.8 percent $P_2O_5$. All percents are given in percent by weight.

U.S. Patent 2,441,853 issued to John E. Stanworth, May 18, 1948, discloses a family of soft phosphate glasses exhibiting what is called good chemical durability and which have high coefficients of thermal expansion. A high coefficient of thermal expansion is desired because these glasses are intended to be used as seals to copper metal. The compositional area of this family of sealing glasses is defined by the following ranges of the oxide ingredients, listed in percent by weight: 28 to 38 percent $P_2O_5$, 8 to 24 percent $Al_2O_3$, 0 to 20 percent $B_2O_3$, 15 to 40 percent PbO, and 10 to 20 percent $Na_2O$ plus $K_2O$. The preferable $B_2O_3$ range is 5 to 15 percent.

U.S. Patent 2,294,844 issued to Frederick Gelstharp, Sept. 1, 1942, relates to phosphate glass batch compositions containing no free phosphoric acid. These phosphate glasses are used to produce optical lenses. The glass batches claimed contain 50 to 100 percent by weight aluminum metaphosphate, 0 to 26 percent by weight of an alkali metal monophosphate and from 0 to 27 percent by weight of monomagnesium phosphate.

U.S. Patent 3,149,234 issued to H. P. Hood et al., Sept. 15, 1964, relates to a family of very soft, high density phosphate glasses for use in high energy radiation shielding windows. The claimed family of glass compositions contain about 26 to 51 percent $P_2O_5$, 33 to 56 percent water and a total of 12 to 26 percent of an oxide selected from the group consisting of PbO, HgO, and $Al_2O_3$, all percents being on a mole percent basis. Various other optional glass forming oxides can be incorporated in these glasses in amounts not to exceed about 5 mole percent. These optional oxides are $Al_2O_3$, BaO, $Cs_2O$, $K_2O$, SnO and ZnO. These glasses are subject to attack by atmospheric moisture and must be protected during use.

What has been discovered in the present invention is a family of ultraphosphate glass compositions exhibiting good chemical durability and which can be melted at relatively low temperatures. The glasses are particularly suited for use in multilaminar radiation shielding windows and for fabricating many types of glass specialty products.

The calculated compositional ranges of the various oxide ingredients of the glasses of the present invention are presented below. All percents are given in percent by weight.

| Component: | Percent |
|---|---|
| $P_2O_5$ | 55–80 |
| BaO | 15–30 |
| CaO | 2–6 |
| PbO | 3–7 |
| $Li_2O$ | 0.5–2 |
| $Al_2O_3$ | 0–1.0 |

As indicated above, the glasses of the present invention are ultraphosphates. The definition of an ultraphosphate glass is one which contains a concentration of phosphate in excess of the phosphate concentration present in a metaphosphate compound.

Phosphoric acid ($HP_3O_4$) contains three hydrogen ions each having a valence of +1. Substituting a metal ion such as aluminum ion having a valence of +3 for the hydrogen content produces aluminum orthophosphate ($AlPO_4$). Metal metaphosphates are produced by first removing a water molecule ($H_2O$) from phosphoric acid ($H_3PO_4$) leaving $HPO_3$, and then substituting a metal for the remaining hydrogen content. The substitution of aluminum for the hydrogen content of $HPO_3$, for example, results in $Al(PO_3)_3$ or aluminum metaphosphate.

The glass compositions of the present invention contain still a higher concentration of phosphate than is contained in the metaphosphate compound, giving rise to the term ultraphosphate.

The characteristics of the glasses of the present invention are unusual because earlier investigators concluded that glasses containing concentrations of $P_2O_5$ in excess of the metaphosphate proportion (ultraphosphate) were highly water soluble. The ultraphosphate glass compositions of the present invention disprove this conclusion.

The ultraphosphate glasses of the present invention are particularly suited for use in radiation shielding windows. One of the most troublesome problems associated with multilaminar radiation shielding windows is that during irradiation the glass sheet of the laminant closest to the source of radiation sustains a considerable build-up of electrical charge. If this build-up of electrical charge becomes too great, spontaneous fracture of the glass sheet occurs.

Another problem associated with radiation shielding windows is that most glasses tend to color upon being irradiated with high energy radiations. This induced coloration is undesirable because it reduces visibility through the windows. Both spontaneous fracture and radiation induced coloration are minimized using the glasses of the present invention. In addition, if the degree of radiation induced coloration in the windows becomes objectionable, it can be removed by a low temperature heat treatment.

The glasses of the present invention can also be used to fabricate many other types of glass articles in addition to radiation shielding windows due to their low temperature melting and forming characteristics. The glasses can be used, for example, to fabricate (1) stained glass artwork products, (2) as a base for various fiber glass-glass matrix composites, (3) as the matrix glass for machinable glass flake-glass matrix composites and (4) as a low temperature castable glass to produce articles, such as inkwells, book ends and ash trays.

These glasses are particularly attractive to the small volume glass fabricator producing a wide variety of different colored products since colorants can be added without altering the desirable melting and forming characteristics. Typical colorants suitable for use with these glasses are compounds containing iron, chromium, manganese, nickel, cobalt, selenium, copper, silver and gold. These colorant compounds can be present in the glass in amounts up to about 0.1 percent by weight based on the total weight of the glass.

The present invention will be more fully understood by making reference to the following detailed examples.

Example I is the preferred embodiment of the present invention and is the best mode contemplated by the inventor for practicing the teachings of his invention.

EXAMPLE I

A preferred composition of the present invention (Composition A) is presented below. All percents are percents by weight.

COMPOSITION A

| Component: | Percent by weight |
|---|---|
| $P_2O_5$ | 68.0 |
| BaO | 22.0 |
| CaO | 4.0 |
| PbO | 5.0 |
| $Li_2O$ | 1.0 |
| Plus Approx. | |
| $Al_2O_3$ | 0.1 |

This preferred glass composition was prepared by mixing the following raw batch materials in the amounts indicated in an 800 milliliter Pyrex beaker. The batch indicated produces about 325 grams of glass.

COMPOSITION A BATCH

| Batch material: | Weight in grams |
|---|---|
| Phosphoric acid (85% $H_3PO_4$) | 340.0 |
| Barium oxide | 72.0 |
| Lead oxide | 16.0 |
| Calcium oxide | 12.0 |
| Lithium carbonate | 10.0 |
| Aluminum oxide | 0.4 |
| | 450.4 |

The phosphoric acid was placed in the Pyrex beaker first. The other batch materials were then added. The batch was then thoroughly mixed by stirring with a Pyrex stirring rod.

The beaker was then placed on a wire screen support and slowly heated to a temperature of about 932° F. over a period of 1 hour using a Bunsen Burner. The temperature was then raised to 1400° F. and held there for an additional 1½ hours. The temperature of the melt was then reduced to 1200° F. for an additional ½ hour. The beaker was then removed from the burner and the molten glass poured onto a steel plate to form a glass patty approximately ¼ of an inch thick by about 6 inches in diameter. When the glass patty had cooled to about 400° F., it was placed in an oven at a tempertaure of about 400° F. The power to the oven was then turned off and the glass was slowly allowed to cool to room temperature over a period of about 2 hours to anneal the glass. The glass patty thus prepared was water clear and of good optical quality. The specific gravity of the glass was determined to be about 2.95 grams per cubic centimeter and exhibited an index of refraction of about 1.547.

To compare the chemical durability of Composition A with several other glass compositions, the following three tests were conducted. The glass durability samples used in the tests were 2 inches long by 2 inches wide by about ¼ of an inch thick.

TEST I

Test I consisted of boiling the glass sample in water for 1 hour.

TEST II

Test II consisted of boiling the sample in a ½ percent by weight sulfuric acid aqueous solution for 1 hour.

TEST III

Test III consisted of boiling the sample in a ½ percent by weight sodium hydroxide aqueous solution for 1 hour.

The calculated chemical compositions of the glasses compared for chemical durability are presented below in Table I. All percents are given in percent by weight.

TABLE I

| | I | II | III | IV | V |
|---|---|---|---|---|---|
| | Plate glass | U.S. 3,149,234, Radiation shielding glass | U.S. 2,077,481, Ultraviolet transmitting glass | U.S. 2,441,853, Durable-high thermal expansion glass | Composition A |
| $SiO_2$ | 71.6 | | 5.4 | 15.5 | |
| $Al_2O_3$ | 0.2 | | | | .1 |
| PbO | | 37.5 | | 30.0 | 5.0 |
| BaO | | | 10.5 | | 22.0 |
| $Na_2O$ | 13.1 | | | 14.0 | |
| $P_2O_5$ | | 56.1 | 79.8 | 33.5 | 68.0 |
| $Li_2O$ | | | | | 1.0 |
| $H_2O$ | | 6.4 | | | |
| CaO | 11.7 | | | | 4.0 |
| MgO | 2.5 | | 4.3 | | |
| $B_2O_3$ | | | | 7.0 | |
| $Na_2SO_4$ | 0.7 | | | | |
| NaCl | 0.1 | | | | |
| $Fe_2O_3$ | 0.1 | | | | |

The results of the three chemical durability tests on the glass compositions investigated are presented below in Table II:

TABLE II.—DURABILITY TEST RESULTS

| | Softening point, °F. | Weight loss in milligrams per hour per square centimeter of glass surface | | |
|---|---|---|---|---|
| | | Test I (Water) | Test II (Acid) | Test III (Alkali) |
| Glass No.: | | | | |
| I | 1,343 | 0.05 | 0.03 | 0.14 |
| II | (1) | (2) | (2) | (2) |
| III | 1,285 | 0.13 | 0.01 | 4.90 |
| IV | 850 | 0.36 | 3 26.26 | 4 90.6 |
| Composition A | 675 | 0.1 | 4.1 | 11.4 |

1 The softening point could not be determined using standard techniques because the glass was destroyed by moisture attack from the atmosphere.
2 Totally destroyed.
3 Glass seriously damaged.
4 Glass severely damaged.

These durability tests indicate that Composition A of the present invention is relatively durable compared to the previously known phosphate based glass compositions. Composition A is not as durable as the commercial soda-lime-silica plate glass composition tested or Composition III but it has the advantage of being melted and formed at much lower temperatures.

These three glasses were then subjected to the three chemical durability tests described in Example I. The results are presented below in Table III.

TABLE III

| | Softening point, °F. | Weight loss in milligrams per hour per square centimeter of glass surface | | |
|---|---|---|---|---|
| | | Test I (Water) | Test II (Acid) | Test III (Alkali) |
| Glass composition: | | | | |
| B | 678 | 0.11 | 3.29 | 26.05 |
| C | 668 | 0.15 | 0.72 | 3.75 |
| D | 665 | 0.23 | 0.64 | 8.34 |

EXAMPLE III

Samples of glass compositions A, B, C and D were prepared by melting the batch materials and then casting the molten glass on a steel mold in accordance with the procedure described in Example I.

The cast slabs were then ground and polished to the desired configuration.

Various measurements were then made on these glass samples to determine their suitability for radiation shielding windows. The results are presented below in Table IV.

TABLE IV

| | Density in grams per cubic centimeter | Log of electrical conductivity at 20° C. | Visible transmission in percent of incident light (Unirradiated) | Visible transmission in percent of incident light after 1×10⁷ rads at room temperature (75° F.) | Visible transmission in percent of incident light after 1×10⁷ rads and after 1½ hrs. heating at 120° C. |
|---|---|---|---|---|---|
| Composition: | | | | | |
| A | 2.954 | 13.1 | 91.5 | 26.1 | 90.5 |
| B | 3.010 | 13.1 | 91.3 | 24.5 | 88.9 |
| C | 2.912 | 13.1 | 90.6 | 21.1 | 88.0 |
| D | 2.915 | 14.6 | 90.4 | 21.0 | 88.6 |

EXAMPLE II

The following raw batch materials for glass compositions B, C, and D of the present invention were weighed out and converted into glasses in accordance with the procedure presented in Example I used to prepare Composition A.

| | Weight in grams | | |
|---|---|---|---|
| Batch materials | Composition B | Composition C | Composition D |
| Phosphoric acid (85% $H_3PO_4$) | 546.4 | 579.6 | 454.0 |
| Barium oxide | 133.8 | 137.6 | 82.2 |
| Lead oxide | 31.8 | 28.0 | 18.7 |
| Calcium oxide | 25.2 | 22.4 | 15.0 |
| Lithium carbonate | 15.8 | 13.9 | 13.9 |
| Aluminum oxide | 0.6 | 0.56 | 0.36 |

The calculated chemical compositions of glasses B, C, and D are presented below. The compositions are given in percent by weight.

| | Percent by Weight | | |
|---|---|---|---|
| | Composition B | Composition C | Composition D |
| Component: | | | |
| $P_2O_5$ | 62.8 | 64.7 | 71.1 |
| BaO | 25.2 | 25.0 | 19.5 |
| CaO | 6.0 | 5.1 | 4.4 |
| PbO | 4.7 | 4.1 | 3.6 |
| $Li_2O$ | 1.2 | 1.0 | 1.3 |
| $Al_2O_3$ | 0.1 | 0.1 | 0.1 |
| Total | 100.0 | 100.0 | 100.0 |

The ultraphosphate glass compositions of the present invention are unique in that certain of the radiation induced color can be bleached out by raising the temperature of the glass to about 120° C. By maintaining the glass temperature at about 120° C. during irradiation, the glass remains fairly clear. The commercial glass compositions used in the fabrication of radiation shielding windows do not have the ability to be appreciably bleached by heat treatments as low as 120° C.

The glasses of the present invention are also highly resistant to spontaneous fracture because their electrical conductivities are approximately $10^{13}$ ohm centimeters compared to conventional radiation shielding glass compositions which have electrical conductivities of approximately $10^{15}$ ohm centimeters.

Although the present invention has been described in terms of specific examples, the invention is not so limited. The invention should only be limited by the language of the appended claims.

I claim:

1. An ultraphosphate glass consisting essentially of in percent by weight 55 to 80 percent $P_2O_5$, 15 to 30 percent BaO, 2 to 6 percent CaO, 3 to 7 percent PbO, 0.5 to 2.0 percent $Li_2O$, and 0.0 to 1.0 percent $Al_2O_3$, having a softening point between 650° F. and 700° F.

2. An ultraphosphate glass according to claim 1 which contains up to about 0.1 percent by weight of a metal colorant compound, the metal of the colorant compound being selected from the group consisting of iron, cobalt, selenium, copper, silver, gold, chromium, manganese, nickel, and mixtures thereof.

3. An ultraphosphate glass consisting essentially of in percent by weight 68 percent $P_2O_5$, 22 percent BaO, 4 percent CaO, 5 percent PbO, and 1 percent $Li_2O$.

4. An ultraphosphate glass consisting essentially of in percent by weight 62.8 percent $P_2O_5$, 25.2 percent BaO, 6.0 percent CaO, 4.7 percent PbO, 1.2 percent $Li_2O$, and 0.1 percent $Al_2O_3$.

5. An ultraphosphate glass consisting essentially of in percent by weight 64.7 percent $P_2O_5$, 25.0 percent BaO, 5.1 percent CaO, 4.1 percent PbO, 1.0 percent $Li_2O$, and 0.1 percent $Al_2O_3$.

6. An ultraphosphate glass consisting essentially of in percent by weight 71.1 percent $P_2O_5$, 19.5 percent BaO, 4.4 percent CaO, 3.6 percent PbO, 1.3 percent $Li_2O$, and 0.1 percent $Al_2O_3$.

References Cited

UNITED STATES PATENTS 2,920,972   1/1960   Godron _____ 106—47

FOREIGN PATENTS 728,808   4/1955   Great Britain.

JAMES E. POER, Primary Examiner